United States Patent [19]

Usami

[11] Patent Number: 4,660,387
[45] Date of Patent: Apr. 28, 1987

[54] CONTROLS FOR REFRIGERATING OR AIR-CONDITIONING UNITS

[75] Inventor: Yutaka Usami, Guildford, Australia
[73] Assignee: Diesel Kiki Co., Ltd., Tokyo, Japan
[21] Appl. No.: 821,547
[22] Filed: Jan. 22, 1986
[30] Foreign Application Priority Data

Jan. 22, 1985 [JP] Japan .................................. 60-7242

[51] Int. Cl.$^4$ .................... F25B 39/04; F25B 41/00
[52] U.S. Cl. ........................................ 62/184; 62/212; 62/225
[58] Field of Search ........................... 62/184, 212, 225

[56] References Cited

U.S. PATENT DOCUMENTS 2,701,688  2/1955  Dillman ........................... 62/212 X
3,613,391 10/1971  Harter .................................. 62/184

Primary Examiner—William E. Wayner
Attorney, Agent, or Firm—Wenderoth, Lind & Ponack

[57] ABSTRACT

Disclosed is a control device having a detector for detecting the degree of superheating or supercooling of refrigerating or air-conditioning units. The detector includes a pressure responsive chamber for guiding the pressure of a coolant and a diaphragm disposed therein. The diaphragm is connected with a temperature-responsive cylinder for sensing the temperature of the coolant and a connecting rod. The connecting rod moves corresponding to the pressure and temperature of the coolant, and the position thereof is sensed by a position sensor means.

4 Claims, 2 Drawing Figures

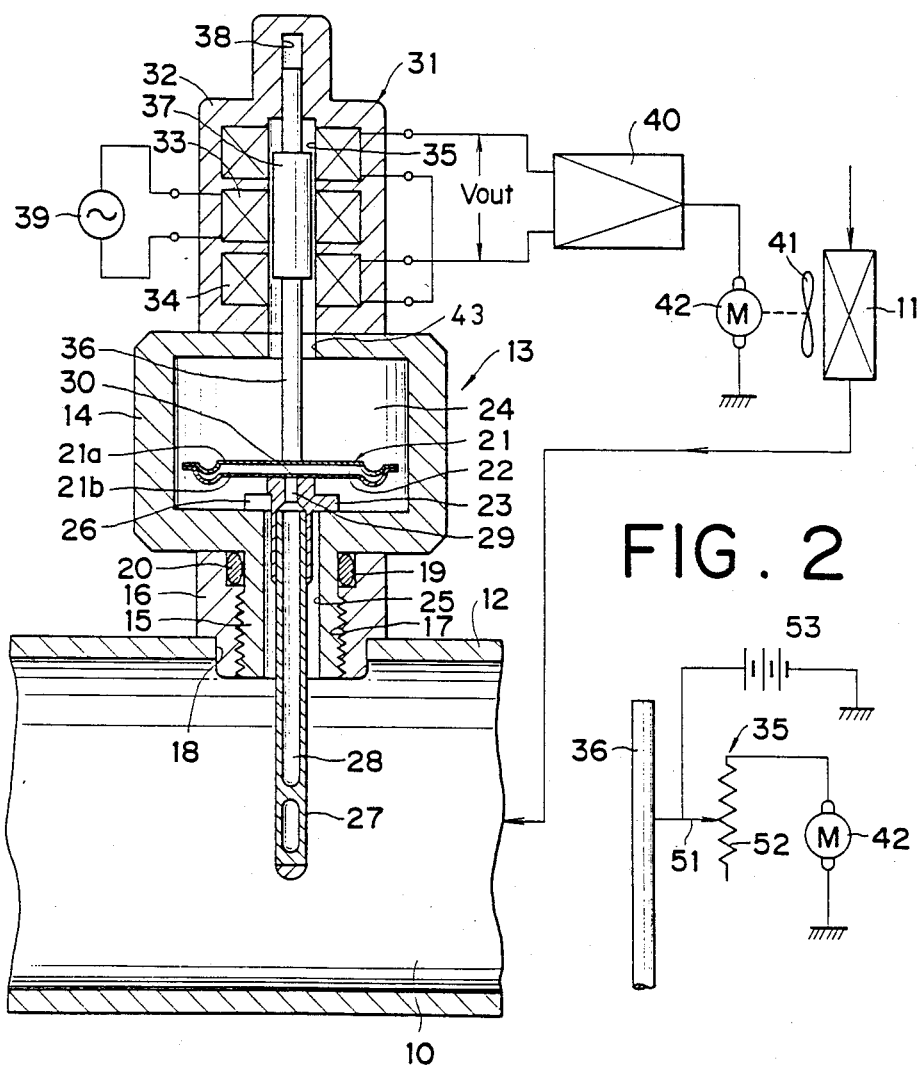

CONTROLS FOR REFRIGERATING OR AIR-CONDITIONING UNITS

BACKGROUND OF THE INVENTION

1. Field of the Invention

This invention relates to a control for refrigerating or air-conditioning units and, more specifically, to a device for detecting either one of the degrees of superheating and supercooling to control a condenser fan or the like.

2. Prior Art

As disclosed in Japanese Utility Model Application Laid-Open SHO 57(1982)-79010, for instance, there is known a control for regulating the speed of rotation of a condenser fan in a refrigerating or air-conditioning unit, which is designed to detect the temperature or pressure of a coolant on the high-pressure side of a refrigerating cycle and thereby vary the terminal voltage of the motor for the condenser fan based on the thus detected signal for the purpose of energy savings and noise reduction.

However, the degree of supercooling correlating with both the temperature and pressure of the coolant on the high-pressure side should be detected to make a determination of what surplus is left in the air-cooling capacity. In the prior art, only either the temperature or the pressure has been detected to control the speed of rotation of the condenser fan. For that reason, there have problems that the air-cooling capacity is not balanced with the speed of rotation of the condenser fan, so that the condenser fan is rotated at high speeds resulting in waste of energy, or at too low speeds resulting in insufficient dissipation of heat from the condenser. A solution to these problems may be provided, if both the temperature and pressure sensors disclosed in the aforesaid publication are arranged in the high-pressure coolant passage to make it possible to calculate the degree supercooling from the outputs thereof. However, this would lead to an increase in the number of the parts involved, make the control complicated and cause an increase in the price.

SUMMARY OF THE INVENTION

An object of this invention is to provide a control device for regulating a condenser fan based on the degree of supercooling.

Another object of this invention is to provide a single device by which both the degrees of supercooling and superheating can be detected.

According to this invention, there is provided a control device including a detector means for detecting of superheating or supercooling of an air-conditioning or refrigerating unit having therein a coolant passage, wherein said detector means includes a body forming a pressure-responsive chamber to be connected to said unit, a diaphragm disposed in said pressure-operable chamber to form a temperature-responsive chamber, a temperature-sensible cylinder having one end disposed in the coolant passage in said unit and the other end connected to said temperature-responsive chamber, and a connecting rod coupled to said diaphragm, and a sensor means for sensing the position of said connecting rod.

Many other advantages, features and additional objects of this invention will become manifest to those versed in the art upon making reference to the detailed description and the accompanying sheet of drawings in which preferred structural embodiments incorporating the principles of this invention are shown by way of illustrative example.

BRIEF DESCRIPTION OF THE DRAWINGS

FIG. 1 is a schematic view of the automotive airconditioner, which shows a section of the detector according to one embodiment of the present invention, and FIG. 2 is a schematic view showing part of another embodiment of the detector of the present invention.

DETAILED DESCRIPTION OF THE PREFERRED EMBODIMENTS

Referring to now to FIG. 1, a coolant passage 10 is formed in a high-pressure line 12 connected on the outlet side of a condenser 11, and a detector 13 for sensing the degree of supercooling is attached to that line 12.

The detector 13 includes a body 14, from the lower portion of which an externally threaded portion 15 extends in an integral manner. That portion 15 is fixedly screwed into an internally threaded hole 17 formed in a flange 16. The flange 16 is welded or otherwise fixed around a mounting hole 18 formed in the high-pressure line 12. In the inner periphery of the upper end of the flange 16 there is formed an O-ring groove 19 in which an O-ring 20 is disposed as a seal sealing between the detector body 14 and the flange 16.

A diaghram 21 includes two discs 21a and 21b which are fixed together around the peripheral edges thereof to define a temperature-responsive chamber 22. The lower disc 21b is secured at the central portion to the lower and inner face of the detector body 14 through 1 fixing member 23, whereby the diaphragm 21 is disposed within a pressure-responsive chamber 24 formed within the detector body 14. The pressure-responsive chamber 24 is in communication with the coolant passage 10 through a communication hole 25 extending through the externally threaded portion 15 of the body 14 and a cut-out portion 26 formed in the fixing member 23.

A temperature-sensitive cylinder 27 is inserted through the communication hole 25, and has the closed end within the coolant passage 10 and has the open end fixedly inserted into the lower portion of the fixing member 23. A space 28 within that cylinder 21 is in communication with the temperature-responsive chamber 22 through a first communication hole 29 formed in the fixing member 23 and a second communication hole 30 formed in the center of the lower disc 21b. Then, a heat-sensitive expandable gas such as Freon is sealed in the temperature-responsive chamber 22, the space 28 and the 1st and 2nd holes 29 and 30 to permit a force corresponding to the temperature prevailing in the coolant passage 10 to act on diaphragm 21.

A position sensor 31 is constructed from a known differential transformer, and includes a housing 32 secured to the upper portion of the detector body 14, around which a primary coil 33 and a secondary coil 34 are wound. The housing 32 includes therethrough a central hole 35, in which a core 37 fixed to a connecting rod 36 is disposed. The connecting rod 36 is fixed at one end to the center of the upper disc 21a of the diaphragm 21 through an insertion hole 43 formed in the detector body 14, and is slidably inserted at the other end into a hole 38 formed in the upper portion of the housing 32.

The primary coil 33 of the sensor 31 is connected an a.c. source 39, while the secondary coil 34 is coupled to a motor 42 for a condenser fan 41 via a voltage amplifier 40. As well-known in the art, an output voltage $v_{out}$ corresponding to the position of the core 37 is produced across the secondary coil 34. Thus, the speed of rotation of the condenser fan 41 is regulated in operable association with the position of the core 37, viz., the displacement of the diaphragm 21, so that air strikes upon the condenser 11 in an amount corresponding thereto for cooling.

In the foregoing arrangement, now assuming the coolant flowing through the passage 10 to remain constant in terms of temperature and vary in terms of pressure alone, the pressure of the heat-sensitive expandable gas in the temperature-responsive chamber remains unchanged. However, there is a variation in the pressure of the coolant guided into the pressure-responsive chamber 24, so that the diaphragm 21 produces an upward or downward force. Then, the connecting rod 38 moves with the core 37 until that force is balanced with the pressure prevailing in the temperature-responsive chamber 22, and the amount of such movement appears as the output voltage $v_{out}$ from the secondary coil 34 of the position sensor 31. That output voltage $v_{out}$ is amplified by the voltage amplifier 40, resulting in variations in the terminal voltage of the motor 42 for the condenser fan 41 and hence the speed of rotation of the condenser fan 41.

On the contrary, assuming the coolant flowing through the passage 10 to remain constant in terms of pressure and vary in terms of temperature alone, the pressure of the coolant in the pressure-responsive chamber 24 remains unchanged, but there is a variation in the pressure of the heat-sensitive expandable gas in the temperature-responsive chamber 22, which variation causes movement of the connecting rod 36 and a change in the speed of rotation of the condenser fan 41 in similar manner.

Referring to FIG. 2, there is illustrated another embodiment of the present invention, wherein the position sensor 31 is constructed from a variable resistor 31. More specifically, a connecting rod 36 similar to that used in the first embodiment is fixedly provided with a moving contact 51 designed to move on a resistor 52. The moving contact 51 is connected with a d.c. source 53, and the resistor 52 is connected at one end with a motor 42 for a condenser fan, which is similar to that used in the first embodiment. As is the case with the first embodiment, the terminal voltage of the motor 42 varies in correspondence with the displacement of the connecting rod 36.

It is appreciated that while in the foregoing embodiments the detector 13 has been described as a detector for the degree of supercooling, a degree-of-superheating detector may be constructed from a similar arrangement, since the degree of superheating is in opposed relation to the degree of supercooling. With such a degree-of-superheating detector, it is also possible to control the capacity of a compressor.

Obviously, many modifications and variations of the present invention are possible in the light of above teachings. It is therefore to be understood that within the scope of the appended claims, the invention may be practiced otherwise than as specifically described.

What is claimed is:

1. A control device including a detector means for detecting the degree of superheating or supercooling of an air conditioning or refrigerating unit having a high pressure coolant line therein, said detector means comprising:
    a body having one end attachable to said coolant line and having a closed end pressure responsive chamber therein open the one end;
    a diaphragm means disposed in said pressure responsive chamber and having a wall toward the one end fixed in said chamber and a wall toward the other end which is movable;
    a temperature sensitive cylinder having one extending out of said pressure responsive chamber through said one end of said body and having the other end opening into said temperature responsive chamber, and a temperature responsive medium filling said cylinder and said temperature responsive chamber;
    a connecting rod coupled to said movable wall and extending out of the other end of said pressure responsive chamber; and
    a sensor means to which said connecting rod is connected for sensing the position of said connecting rod and producing an output representative of the degree of superheating or supercooling in the unit.

2. A control device as claimed in claim 1 further comprising a voltage supply means for supplying the terminal voltage of a motor for a condenser fan for the unit, and said sensor means comprises means for varying the voltage corresponding to the output from said sensor means.

3. A control device as defined in claim 1, wherein said position sensor means is a differential transformer.

4. A control device as defined in claim 1, wherein said position sensor means is a variable resistor.

* * * * *